D. GESTETNER.
PRINTING TYPE.
APPLICATION FILED OCT. 26, 1909.
1,008,132.
Patented Nov. 7, 1911.
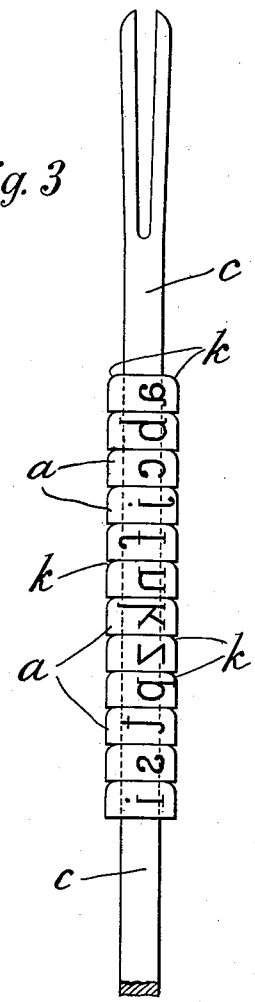
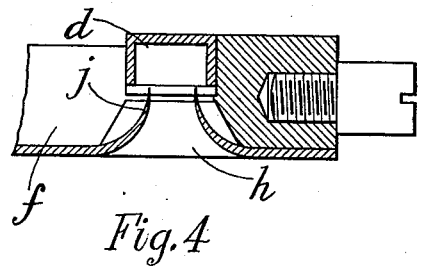
Fig. 4
Fig. 3
Fig. 1
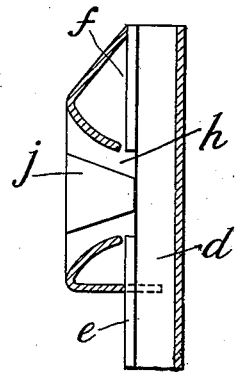
Fig. 2  Fig. 5
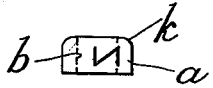
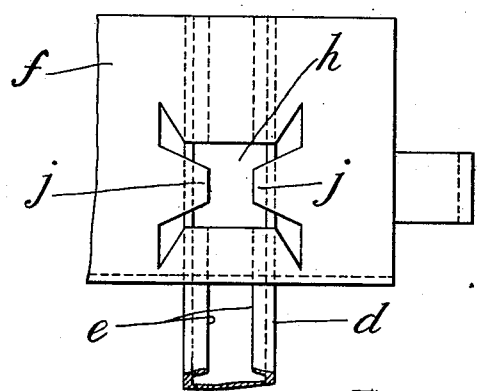
Fig. 6
Witnesses:
Clara Hohenstein
Marion Gifford
Inventor
David Gestetner
By Knight & Bros.
Attys
COLUMBIA PLANOGRAPH CO., WASHINGTON, D. C.

UNITED STATES PATENT OFFICE.

DAVID GESTETNER, OF TOTTENHAM HALE, ENGLAND.

PRINTING-TYPE.

1,008,132. Specification of Letters Patent. Patented Nov. 7, 1911.

Application filed October 26, 1909. Serial No. 524,610.

*To all whom it may concern:*

Be it known that I, DAVID GESTETNER, a subject of the King of Great Britain, residing at Tottenham Hale, in the county of Middlesex, England, have invented new and useful Improvements in Printing-Type, of which the following is a specification.

The invention has for its object an improved construction of type to facilitate the distribution thereof into approximately vertical type troughs.

I will describe my invention by the aid of the accompanying drawing, in which:

Figure 1 is an end view and Fig. 2 a plan of one of my improved type. Fig. 3 is plan view of a number of such type arranged on a composing and distributing rod, and Fig. 4 is a horizontal section, Fig. 5 a vertical section and Fig. 6 a front elevation of the upper part of a slightly inclined but approximately vertical type trough to receive the type from the composing and distributing rod.

According to my invention, I employ type $a$, each being formed, as heretofore, with a hole or slot $b$ of other than completely circular form, preferably square as shown, and according to my invention, I form such type of general rectangular shape on each of its six sides, adjacent sides being at right angles to each other and the two vertical edges of one side being beveled as shown at $k$, for the purpose hereinafter mentioned. In connection with such type, I use a composing and distributing stick consisting, as heretofore, of a rod or wire $c$, the section of which corresponds with that of the hole or slot $b$ in the type. The composing and distributing rod or wire $c$ is split at one end, and the two arms thus formed are sprung slightly outward and are beveled off to enable them freely to pass into the holes or slots $b$ of the type $a$, while such arms will prevent the type accidentally falling off said rod or wire.

Type $a$ and a composing and distributing rod or wire $c$ are used in combination with troughs $d$, the cross section of which corresponds in shape with that of the plan view Fig. 2 of the type $a$, but having a longitudinal slot $e$ in the front thereof and having all the corners square. Fixed to the upper ends of a set of these troughs $d$ is a bar $f$ which is provided with outwardly splayed holes $h$ which are at right angles with the direction of the troughs. The rear ends of these holes $h$ are in communication with the troughs $d$ and they are of such size as to permit the type freely to enter the troughs. The holes $h$ are each provided with a pair of spring clips $j$ which are capable of springing outward to receive a type from the rod or wire $c$ and of springing back to prevent said type from being pulled back with such rod or wire.

To distribute the type from the rod or wire $c$, the pointed split end of the latter is caused to enter the holes $h$ and a type on such rod or wire is forced past the retaining spring clips $j$, the ends of which latter will pass into the spaces formed between the type by the beveled edges $k$ on two vertical faces of the latter, thus securely gripping the type and separating it from the other type on the rod or wire and removing it therefrom.

I claim—

A hollow type having a non-circular hole therethrough and each of its six sides of general rectangular shape with adjacent sides at right angles to each other and with the two vertical edges of one side beveled so as to form spaces between adjacent type when on a composing and distributing rod to thereby facilitate the separation and delivery of such type.

In witness whereof I have hereunto set my hand in presence of two witnesses.

DAVID GESTETNER.

Witnesses:
WILLIAM REID,
CHRISTINE SQUIRE.

Copies of this patent may be obtained for five cents each, by addressing the "Commissioner of Patents, Washington, D. C."